(12) United States Patent
Fisher et al.

(10) Patent No.: US 6,315,841 B1
(45) Date of Patent: Nov. 13, 2001

(54) INDUCTION HARDENED FORGED GEAR AND PROCESS FOR PREPARING SAME

(75) Inventors: James S. Fisher, Auburn; Roland C. Smith, Milford, both of IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/476,032

(22) Filed: Dec. 31, 1999

(51) Int. Cl.[7] .............................. C21D 9/32; C21D 8/00
(52) U.S. Cl. ........................ 148/328; 148/586; 148/573
(58) Field of Search .................................. 148/328, 586, 148/573

(56) References Cited

U.S. PATENT DOCUMENTS

| | | | |
|---|---|---|---|
| 4,761,867 | * 8/1988 | Vollmer et al. | 29/159.2 |
| 4,820,357 | * 4/1989 | Davison et al. | . |
| 4,885,831 | * 12/1989 | Fett | 29/159.2 |
| 4,895,700 | * 1/1990 | Davison et al. | 420/8 |
| 4,949,456 | * 8/1990 | Kovach et al. | 29/863.35 |
| 5,135,810 | * 8/1992 | Smith et al. | 428/579 |

FOREIGN PATENT DOCUMENTS

| | | | |
|---|---|---|---|
| 2449237 | * 4/1976 | (DE) | 148/573 |
| 10017935-A | * 1/1998 | (JP) . | |
| 410317095A | * 12/1998 | (JP) . | |
| 11131135-A | * 5/1999 | (JP) . | |

\* cited by examiner

*Primary Examiner*—Deborah Yee
(74) *Attorney, Agent, or Firm*—Scott M. Oldham; Hahn, Loeser + Parks LLP

(57) ABSTRACT

Bevel gears having a carbon content of at least about 0.4% by weight, preferably 0.5% by weight are manufactured by a process which includes forging a steel blank having a carbon content of at least 0.4% by weight until a bevel gear precursor having essentially the tooth configuration and dimensions of the desired product gear is obtained, and hardening the teeth of the gear precursor by induction heating without machining of the teeth. The initial forging is precise enough so that no further machining of the teeth is required. This requires forging to a tolerance specified in AGMA class 6. The gear is then induction hardened, first by preheating at a lower frequency, say 10 KHz, then induction heating at a higher frequency, say 50 KHz, in order to obtain a desired hardness profile. The desired hardness profile includes the surface hardness of at least 50, preferably 60, on the Rockwell C scale and a core hardness not over Rockwell C 45, preferably from Rockwell 25 to Rockwell 40. This invention provides a low-cost manufacturing process which is especially suited for differential gears, such as pinion mate gears and side gears, and other non-automotive gears that do not have to carry a high torque load. This process eliminates costly steps of manufacturing and carburizing heat treatment.

14 Claims, 1 Drawing Sheet

INDUCTION HARDENED FORGED GEAR AND PROCESS FOR PREPARING SAME

TECHNICAL FIELD

This invention relates to processes for preparing gears and for the gears so obtained, and more particularly to an induction hardened forged gear and a process for preparing the same.

BACKGROUND OF THE INVENTION

Processes for preparing gears which include forging heat treatment and machining, a low carbon steel, typically containing about 0.2% by weight carbon, are known. Disadvantages of using a low carbon steel of this type are twofold. First, a carburizing heat treatment is required because it is not possible to obtain sufficient hardness otherwise when starting with such a low carbon steel. Secondly, a low carbon steel containing about 0.2% by weight carbon cannot be heat treated by induction heat treating.

It has been reported in the prior art that ring gears for heavy duty automotive vehicles such as trucks can be fabricated by a process essentially as described above, starting with a low to medium carbon steel which can contain anywhere from about 0.05% by weight carbon to 0.4% by weight carbon. It has been further reported that the steel can be precision forged so that no further shaping of the tooth profiles, after the final heat treatment, is required. However, it is necessary to use a carburizing heat treatment in this process.

A process for making an automotive vehicle ring gear which includes forging, machining the result in forging, and induction heating is also known. In this process, a blank is Anear-net@ forged such that no more than about 0.070 inch of metal has to be removed from the sidewalls of each gear tooth. The resulting forging is then machined, and finally, when a high carbon steel is used, the ring gear surface can be contour induction hardened. This process is also disclosed as being applicable to medium carbon steels containing from 0.05% carbon to 0.6% carbon.

Presently known gear fabrication process, whether used for the manufacture of low motion transmission error (MTM) gears such as ring gears for automotive vehicles, or Ahigh MTM@ gears, such as differential gears (e.g. a pinion mate gear or side gear) for automotive vehicles, or for making gears for lighter vehicles such as lawn mowers and golf carts and the like, have generally required either carburizing or machining or both. Such operations add considerably to the expense of the manufacturing. Furthermore, such processes requiring such steps are unnecessary for the manufacture of high MTM torque gears.

SUMMARY OF THE INVENTION

The present invention provides a low cost process for manufacturing of high MTM gears, such as automotive vehicle differential gears, (e.g. a pinion mate gear or side gear), and gears for smaller vehicles such as golf carts and lawnmowers. The gear may be either a straight bevel gear or a spiral bevel gear. Automotive vehicle differential gears are normally of the straight bevel gear type. Other gears manufactured herein may be either of the straight bevel gear or the spiral bevel gear type.

The present process comprises the steps of forming a bevel gear having teeth by forging a steel blank having a carbon content of at least about 0.4% by weight until a bevel gear precursor having essentially the tooth configuration and dimensions of the desired product gear is obtained, and then hardening the gear precursor so obtained by induction hardening to obtain a gear having relatively high surface hardness, e.g., Rockwell C50 or higher, and a softer core, having a Rockwell hardness of about Rockwell C45 or lower.

This invention provides a low-cost manufacturing process, especially suited for differential gears such as pinion mate gears and side gears, and other gears which do not have to be manufactured with low MTM (below 40 micro radians), which eliminates the costly steps machining and carburizing heat treatment.

DESCRIPTION OF THE PREFERRED EMBODIMENTS

This invention will now be described in detail with reference to preferred embodiments including the best mode and preferred embodiment of this invention. In particular, the description herein will be with reference to formation of a straight bevel gear for an automotive vehicle differential. This straight bevel gear may be either a pinion mate gear or a side gear, both of which are conventionally situated inside a differential case. As noted earlier, the present invention is also applicable to the manufacture of other Ahigh MTM@ gears such as are used in lighter vehicles, for example lawn mowers and golf carts.

The starting material for the present process is a gear blank of the surface a steel alloy containing at least about 0.4% by weight carbon, preferably at least about 0.45% by weight carbon. A preferred carbon content is 0.5% by weight. An especially preferred starting steel is SAE 1050, which has a carbon content of 0.5% by weight. Another suitable alloy steel is AISI 8650, which also has a carbon content of 0.5% by weight.

Figure 1:
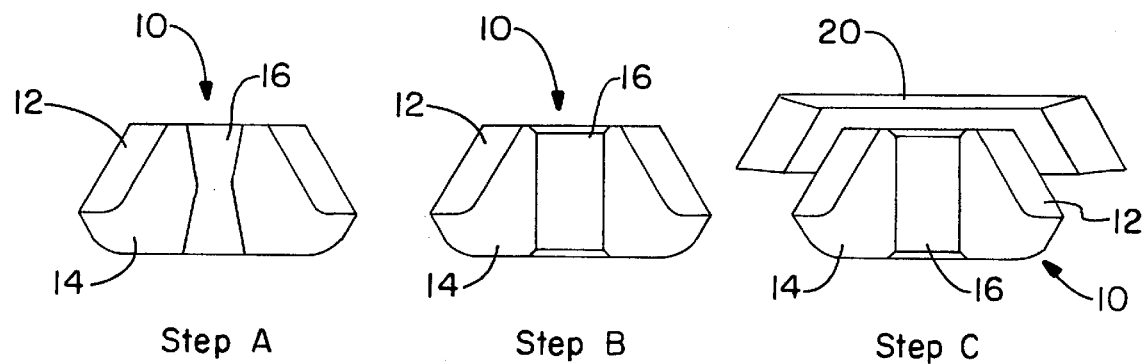
FIG. 1 is a diagrammatic flow sheet of a preferred process of this invention.

The first step, designated as Step A in FIG. 1 of the drawing, is to obtain a gear forging 10 which has a plurality teeth 12 on an outer circumferential surface, and which may also have a web 14 and a central hole or bore 16. The forging or gear precursor obtained in Step A has teeth 12 which are formed by forging to essentially the configuration and dimensions required in the final product gear, so that no further machining or finish grinding of the gear teeth will be required. Forging techniques for accomplishing this degree of precision are known. Maximum absolute and preferred deviations are in accordance with American Gear Manufacturers Association (AGMA) class 6 tolerances.

The second step of the process is, shown as Step B in FIG. 1, is to machine non-tooth areas of gear 10. These non-tooth areas which may be machined include, for example, web 14, bore 16, a mounting shoulder, and an AID@ (internal diameter) spline (which is required on side gears). As stated earlier, no machining of the gear teeth 12 is required, since these have been forged to within the precision necessary in the final product.

The next step, shown as Step C in FIG. 1, is to heat the gear by induction heating in order to harden the gear teeth.

Other areas of the gear may also be hardened at this time if necessary. This may be done by carrying out induction heating in a multiple frequency induction heating machine 20, first subjecting the gear to a lower frequency of about 10 kilohertz (KHz) to preheat the gear then to a higher frequency of 50 KHz to obtain to heat up the entire gear and to obtain the desired hardness profile. More broadly, the lower frequency may be from about 3 to about 20 KHz, preferably from about 3 to about 10 KHz. The higher frequency may be from about 40 to about 250 KHz, preferably from about 40 to about 60 KHz, most preferably 50 KHz. An induction heating machine suitable for this purpose is an Ajax laboratory manufactured by Ajax Magnethermic of Cleveland, Ohio. A preferred hardness profile includes a surface hardness of at least 50 on the Rockwell C scale (Rockwell C50), preferably Rockwell C60, and a core hardness not over Rockwell C45, preferably from Rockwell C25 to Rockwell C40.

Preheating first at a lower frequency, say 10 KHz, heats the gear from the core outward toward the surface. Induction heating at a higher frequency, say 50 KHz, heats the gear from the surface inward. The final temperature of the gear after induction heating at 50 KHz should be above the austenitizing temperature which is about 1700 EF.

The carbon content of the gear is essentially the same both before and after induction heating. First, a carburizing atmosphere is not used. Second, induction heating is too brief for carbon transfer such as that which takes place during carburization.

The induction heated gear is quenched in suitable quenching medium. A commercial polymer-water quenching medium may be used. Use of such quenching medium results in rapid cooling so that the austenitic metallurgical structure is converted to a martensitic structure. The resulting quenched gear has the desired surface hardness, i.e., at least about Rockwell C50 and preferably at least about Rockwell C60. Water is avoided as a quenching medium because water quenching is too drastic. Air cooling is not used because it is too slow, allowing the gear to revert to an undesired metallurgical form (e.g., martensite) which does not have the desired surface characteristics.

Finally, the induction hardened forged gear obtained in Step C may be subjected to a finishing treatment (not shown in FIG. 1) if desired. This step is optional and is omitted in most cases.

Figure 2:
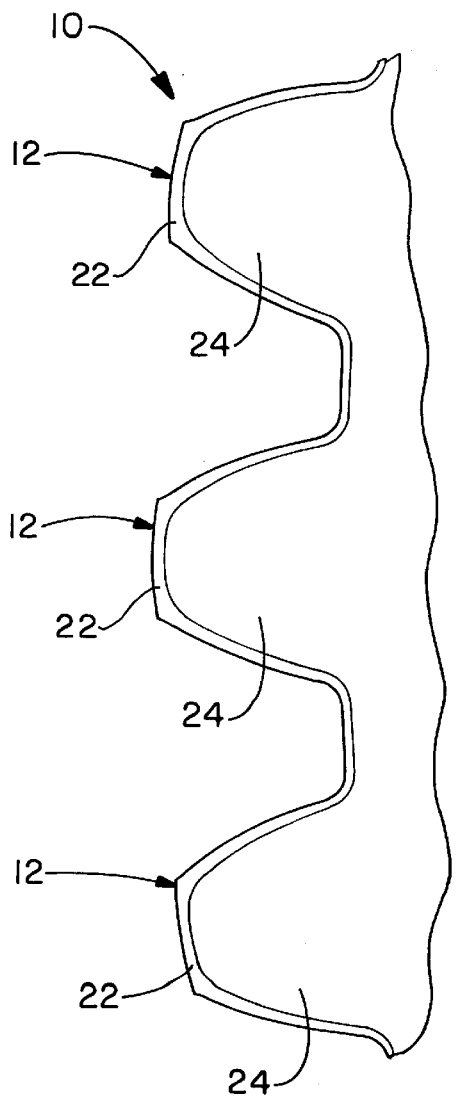
FIG. 2 is a schematic representation of a portion of a gear tooth, indicating hardened areas.

FIG. 2 is a fragmentary view, looking along the central axis of gear 10, showing schematically three successive gear teeth 12. Gear teeth 12 have a hardened surface area 22 and a core 24 of lesser hardness. The hardened surface area or layer 22 may have a hardness of at least Rockwell C50 and preferably at least Rockwell C60, and the core 24 may have a hardness not over Rockwell C45, preferred from Rockwell C25 to Rockwell C40 as previously stated.

Figure 3:
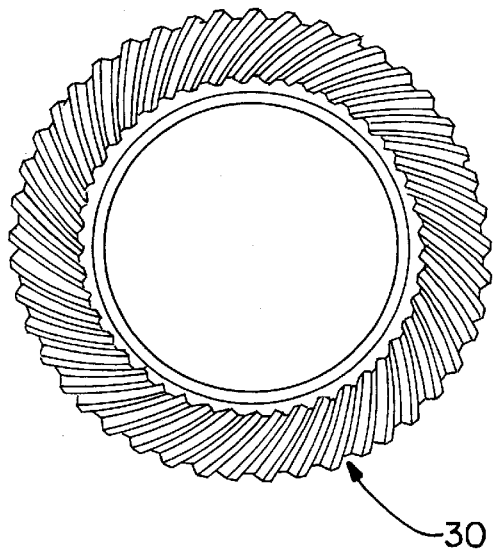
FIG. 3 is an elevational view of a spiral bevel gear which can be prepared according to the process of this invention.

The present process has been described with particular reference to the production of a straight bevel gear. However, this process can also be used for the manufacture of a spiral bevel gear such as spiral bevel gear 30 shown in FIG. 3. Since the structure of spiral bevel gear 30 may be conventional, it will not be described in detail.

The present process is a low-cost economical process, particularly suited to the manufacture of gears which do not carry heavy torque loads, such as pinion mate gears and side gears for automotive vehicle differentials, as well as gears for light vehicles such as lawn mowers and golf carts, as aforementioned. The gears obtained by this process meet all the dimensional and service requirements required for such gears, and are obtained at much lower cost than is possible using presently known processes.

While this invention is being described in detail with reference to the best mode and preferred embodiment, should be understood that such descriptions are by way of illustration and not by way of limitation.

What is claimed is:

1. Process for manufacturing a bevel gear, comprising the steps of:
    (a) forming a precursor for a bevel gear having teeth by forging a steel blank until a bevel gear precursor having essentially the tooth configuration and dimensions of the desired bevel gear is obtained, said steel blank having a carbon content of at least about 0.4% by weight; and
    (b) hardening the teeth of the bevel gear precursor by induction hardening without pre-hardening or post-hardening machining of the teeth.

2. The process of claim 1, wherein said gear is a straight bevel gear.

3. The process of claim 1, wherein said gear is a spiral bevel gear.

4. The process of claim 1, wherein said bevel gear is a differential gear for an automotive vehicle.

5. The process of claim 1, wherein said steel blank has a carbon content of at least about 0.45% by weight.

6. The process of claim 1, wherein said steel has a carbon content of at least about 0.5% by weight.

7. The process of claim 1, wherein said induction hardening comprises heating at a first frequency from about 3 to about 20 KHz and then at a second frequency from about 40 to about 250 KHz.

8. The process of claim 1, wherein the bevel gear has a surface hardness of at least about Rockwell C50 and a core hardness not greater than about Rockwell C45.

9. A bevel gear manufactured according to the process of claim 1.

10. A bevel gear according to claim 9, said bevel gear having a surface hardness of at least about Rockwell C50 and a core hardness not greater than about Rockwell C45.

11. A bevel gear according to claim 9, said bevel gear being a differential gear for an automotive vehicle.

12. A bevel gear according to claim 9, said bevel gear being a differential pinion mate gear.

13. A bevel gear according to claim 11, said bevel gear being a differential side gear.

14. A bevel gear according to claim 9, wherein said bevel gear is a straight bevel gear.

* * * * *